Figures 1, 2, 3, 4, 5:
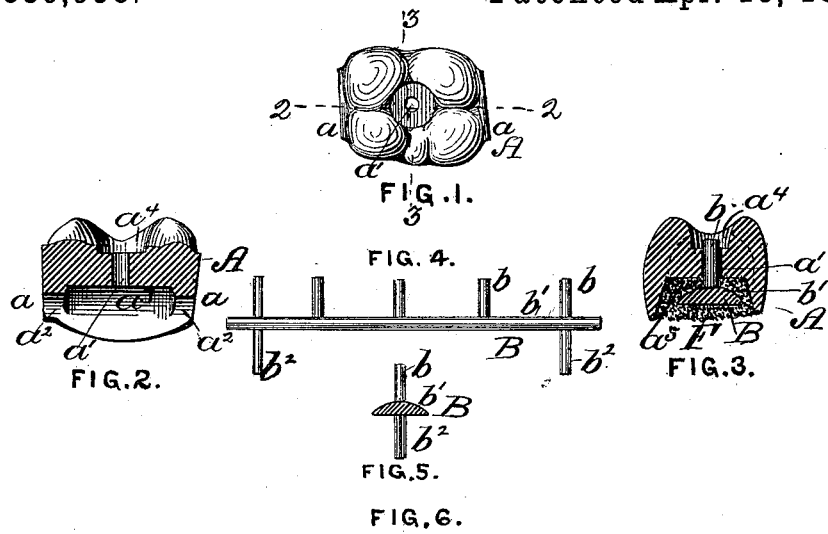

(No Model.)

J. W. WHITE.
ARTIFICIAL TOOTH.

No. 339,958. Patented Apr. 13, 1886.

WITNESSES: INVENTOR:
James W. White.
by his Attys,
Baldwin, Hopkins & Peyton.

UNITED STATES PATENT OFFICE.

JAMES W. WHITE, OF PHILADELPHIA, PENNSYLVANIA, ASSIGNOR TO THE S. S. WHITE DENTAL MANUFACTURING COMPANY, OF SAME PLACE.

ARTIFICIAL TOOTH.

SPECIFICATION forming part of Letters Patent No. 339,958, dated April 13, 1886.

Application filed January 5, 1886. Serial No. 187,726. (No model.)

*To all whom it may concern:*

Be it known that I, JAMES W. WHITE, of the city and county of Philadelphia, in the State of Pennsylvania, have invented certain new and useful Improvements in Artificial Teeth for Bridge-Work Dentures, of which the following is a specification.

Bridge-work is a manner of inserting artificial teeth in the mouth by means of a bridge or truss from one tooth or tooth-root to another, the intervening bridge carrying one or more teeth for masticating purposes between the teeth or roots supporting the bridge. The object of this kind of work is to get rid of the so-called "dental plates"—such as the usual hard-rubber dental plate, for example—which depend for their hold upon the mouth upon the exhaustion of the air beneath the plate, which is objectionable for known reasons not necessary to be stated. The artificial teeth are generally mounted on these bridges by being soldered thereto, or by means of pins projecting from the bridge and fitted into vertical openings made through the teeth, the teeth being locked upon the pins by means of a suitable cement or otherwise. The teeth in the pin arrangement, which is a preferable method of mounting the teeth upon a bridge, in my opinion, are therefore pivoted upon the bridge, and in the course of time, in many instances in a short time, they become loose on their pins and have a tendency to revolve or be turned thereon, to the derangement of the artificial denture.

One of the objects of my invention—the principal object—is to prevent the artificial teeth from turning upon their connecting or pivot pins, and to securely connect them with the bridge-work, so that, notwithstanding they may become loose upon the pins, they cannot turn or twist thereon to the derangement of the denture.

Another object of my invention is to secure the artificial teeth upon the pins of the bridge-work so that they cannot turn if they should become loose upon said pins, and to prevent in a much greater degree than heretofore the liability of even the looseness to occur between the pins and the teeth.

Another object of my invention is to so mount the teeth upon the bridge that they will have firm abutting sides or edges, whereby they brace each other and prevent the bending or swaying of the bridge or truss on which they are mounted.

To attain the objects of my invention, I construct the artificial teeth for bridge-work with their approximal sides of square or flat or other equivalent shape, so that when the teeth are applied to the bridge or truss their sides will abut against each other, or be substantially in contact, and thus prevent each other from turning, as they will be locked from turning by their abutting sides, it being impossible for the teeth to turn on their separate independent pins or connections with the bridge when thus constructed and mounted.

My invention further consists of an artificial denture having the teeth thereof provided with flat, square, or equivalent abutting sides or edges, whereby the teeth brace each other and strengthen the denture.

My invention also further consists of an artificial tooth having a transverse groove to fit the ridge or upper side or edge of the truss or bridge bar, and a further recess or chamber in the body of the tooth for the reception of the cement or retaining material which is to lock or to aid in locking the tooth upon the supporting or carrying truss or bridge-bar.

My invention further consists of an artificial tooth having a transverse groove in its base to receive the upper side or edge of a bridge-bar or truss, a recess or chamber in the body of the tooth communicating with said groove, and a vertical opening extending through said tooth to the cutting, grinding, or masticating end thereof.

The subject-matter claimed by me is particularly pointed out at the close of this specification.

Some of my said improvements so claimed by me may be used without the others.

Figure 6:
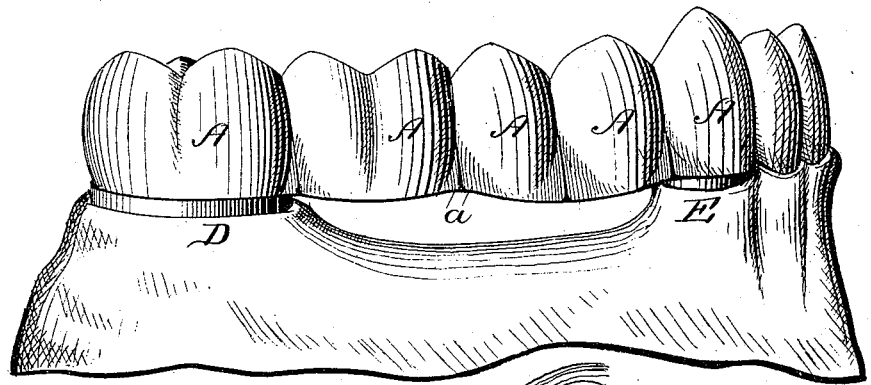
Figures 7, 8:
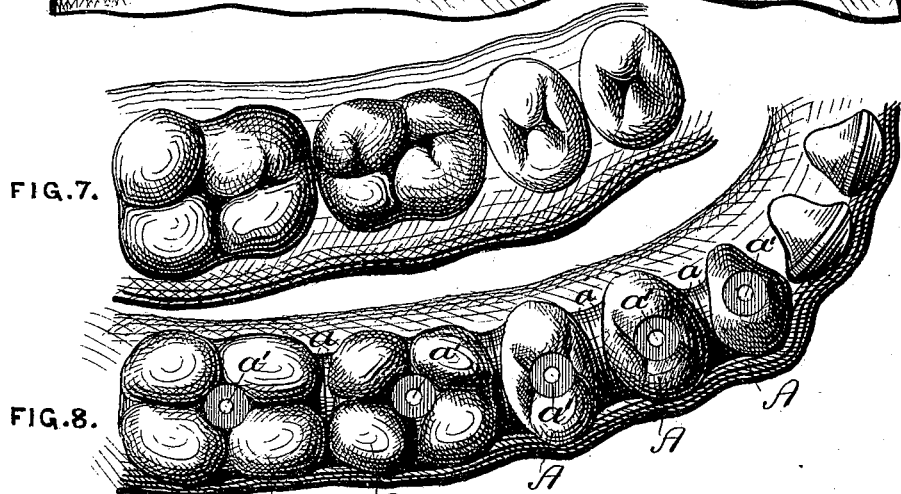

In the accompanying drawings, Figure 1 is a plan or top view of one of my improved artificial teeth. Fig. 2 is a transverse section therethrough on the line 2 2 of Fig. 1, and Fig. 3 is a section through the tooth at right angles to the line of section in Fig. 2 on the line 3 3 of said Fig. 1. Fig. 4 is a view of one form of bridge-bar or truss, and Fig. 5 is a cross-section therethrough. Fig. 6 is a view of the bridge-work completed and attached to the jaw. Fig. 7 is a plan view of a bridge-work having teeth of the old or usual form of construction—that is, with rounded approximal sides or edges, and Fig. 8 is a similar view of a bridge-work denture having teeth embodying my improvements.

In the old or usual way of constructing teeth for bridge-work dentures the approximal edges of the artificial teeth of the bridge-work are rounded or curved corresponding to the structure and contour of the natural teeth, as illustrated, for example, in Fig. 7.

Nature provides by means of peculiarly-formed roots and sockets for preserving the integrity, alignment, and arrangement of the natural teeth, providing effective means for preventing them from turning or twisting in their sockets; but when similarly outlined, contoured, or curved teeth are employed artificially on the pins of a bridge-work the rounded or curved approximal sides or edges need some additional artificial means to prevent them from turning on their pins. For this reason I provide my improved artificial bridge-work tooth A with square or flat or equivalent formed abutting sides or edges $a$ at the approximal sides thereof, and with a vertical hole or opening, $a'$, extending through the tooth to receive the pin $b$ of the bridge-work or truss B. The end or base of the tooth is also provided with a transverse groove, $a^2$, extending entirely across the end of the tooth to form a seat conforming preferably in shape to the shape of the upper side or edge or ridge, $b'$, of the truss B. The groove $a^2$ is preferably arched or curvilinear to fit the preferably curved or convex upper side or edge or ridge of the truss or bridge B, as clearly shown in Figs. 2, 3, 4, and 5. The end or base of the tooth is also preferably provided with a recess or chamber, $a^3$, which constitutes a recess or chamber above the truss or bar B, and enables the cement, amalgam, or whatever retaining medium may be employed to aid in securing the teeth upon the bridge-bar or truss, to flow around or envelop the said truss or bridge-bar, as clearly shown in Fig. 3. Said recess or chamber $a^3$, it will be observed, is shorter than the transverse groove $a^2$, and is enlarged laterally relatively to said groove; and this permits the cement or amalgam to be readily and practically applied around the bridge or truss-bar, as clearly shown in Fig. 3.

In completing the bridge-work according to my improvements, the supporting-roots D E may be prepared in the usual manner, and the bridge or truss B united thereto by means of pins $b^2$ $b^2$, fitting openings or sockets in the ends of the roots, which are to support the bridge, as usual. My improved teeth are then mounted upon the bridge-bar or truss with the pins $b$ thereof passing through the vertical openings in said teeth, and with the bar or truss nicely fitting the groove $a^2$ in the base of the tooth, and with the flat or abutting sides of the teeth in contact or substantially in contact with each other. The cement or amalgam or other plastic material F to fasten the teeth in place upon the bar or truss is then applied, and caused to flow around, or is filled in the recess or chamber $a^3$ in the end of the tooth, and envelops the bridge-bar or truss. Some of the cement or other material is also packed about the pins, which pass through the teeth, and about the ends of said pins, which preferably project into an enlargement, $a^4$, of the vertical opening through the tooth at the grinding or masticating or cutting face thereof. As soon as the cement or fastening material has set or become hard the teeth will be securely and firmly fastened upon the bridge-bar or truss B, and it will be obvious that they will be rigid as against turning movements or twisting strains, acting in fact by their abutting edges to absolutely prevent any such movement.

Another important advantage due to the construction I have described is that the abutting edges of the teeth also prevent the bending or swaying of the bridge-bar or truss under the pressure of mastication or otherwise, as the teeth act in effect like key-stones, the contact of the sides of the teeth preventing any sagging or bending or depression of the bridge-bar or truss, which cannot take place without crushing the tooth structure.

The space left by the extraction of two or more teeth varies in different cases, and it is frequently difficult to properly fill the space, as when it is too narrow for three teeth or too wide for two. My invention provides the opportunity by grinding of the approximal walls or wings of this form of teeth to obtain a close fit in varying cases.

I do not deem it necessary to elaborate further the advantages of my improvements, as the more important advantages are sufficiently indicated above.

I claim as my invention—

1. An artificial tooth having a vertical opening therein and flat or equivalent shaped approximal side or sides, substantially as described, whereby the tooth may be securely mounted upon a pin, and by the contact of its approximal side or sides with the adjacent tooth or teeth prevent any independent turning or rotative movement of the tooth about said pin, as hereinbefore fully set forth.

2. An artificial denture consisting of a bar or support fitted with a pivot pin or pins, and having a vertically-open tooth or teeth fitted upon said pin or pins with flat or equivalent abutting sides or edges, substantially as described.

3. An artificial tooth having a transverse groove extending entirely across the base or neck thereof, and a laterally-enlarged but shorter recess or chamber in the body of said tooth communicating with said basal groove, substantially as described.

4. An artificial tooth having a transverse groove in its base to receive the upper side or edge of a bridge-bar or truss, a recess or chamber above said bar or truss, and a vertical opening extending from said chamber through to the face or grinding, cutting, or masticating end of the tooth, substantially as described, whereby the tooth may be securely mounted upon a truss or bridge-bar having a retaining-pin projecting therefrom to fit th vertical opening of said tooth by means of a cement or plastic material packed or run into said recess or chamber to envelop said truss or bar, as hereinbefore fully set forth.

In testimony whereof I have hereunto subscribed my name.

JAMES W. WHITE.

Witnesses:
W. STORER HOW,
W. R. POTTER.